United States Patent [19]

Iltzsche et al.

[11] Patent Number: 5,791,829
[45] Date of Patent: Aug. 11, 1998

[54] METHOD OF SHOCK-REDUCED PNEUMATIC PLUG CONVEYANCE OF BULK MATERIALS AND DEVICE FOR IMPLEMENTING THE METHOD

[75] Inventors: Manfred Iltzsche; Reinhard Ernst, both of Weingarten; Eugen Metzler, Ebenweiler, all of Germany

[73] Assignee: Waeschle Maschinenfabrik GmbH, Weingarten, Germany

[21] Appl. No.: 704,691

[22] PCT Filed: Feb. 1, 1996

[86] PCT No.: PCT/DE96/00173

§ 371 Date: Sep. 16, 1996

§ 102(e) Date: Sep. 16, 1996

[87] PCT Pub. No.: WO96/23717

PCT Pub. Date: Aug. 8, 1996

[30] Foreign Application Priority Data

Feb. 2, 1995 [DE] Germany ............... 195 03 383.3

[51] Int. Cl.⁶ ............................................. B65G 53/66
[52] U.S. Cl. .................................................... 406/50
[58] Field of Search ........................................ 406/50

[56] References Cited

U.S. PATENT DOCUMENTS 3,380,780  4/1968  Allen et al. .................. 406/50
4,904,127  2/1990  Morimoto et al. ............ 406/50
5,240,355  8/1993  Hudalla .

FOREIGN PATENT DOCUMENTS 22 19 199   10/1973   Germany .
262 12 70   11/1976   Germany .

*Primary Examiner*—Gary C. Hoge
*Attorney, Agent, or Firm*—Henry M. Feiereisen

[57] ABSTRACT

Methods and devices for the conveyance of bulk materials by a compressible conveying medium and in the form of discrete plugs from bulk materials in pipes are known. A disadvantage is the high-energy and abrupt expansion of the volume of the conveying medium between the plug being discharged and the one following it at the end of the pipe. This disadvantage may be avoided in that the amount (2') of compressed conveying medium existing in each case between plugs (1') in sequence in the downstream end portion (12b) of the pipe as compared to the amount (2) of compressed conveying medium (2) existing between plugs (1) upstream (at 12a) of the end portion (12b) of the pipe is reduced. This is particularly achieved by converting the long plugs (1) into plugs of reduced length (1'), following each other in reduced spacing.

18 Claims, 4 Drawing Sheets

1

METHOD OF SHOCK-REDUCED PNEUMATIC PLUG CONVEYANCE OF BULK MATERIALS AND DEVICE FOR IMPLEMENTING THE METHOD

BACKGROUND OF THE INVENTION

1. Field of the Invention

The invention relates to a method of slowly conveying bulk, particularly plug-like, material pneumatically in a pipe as well as to a device for implementing the method.

2. Description of the Prior Art

Methods of piping high bulk concentrations by thrust are known in which the bulk material is conveyed in the form of a closed rod thereof or in the form of discrete plugs (plug conveyance). Whilst good results have been achieved for plug or slow conveyance in small to medium pipe diameters and short to medium lengths thereof, considerable problems may be encountered where longish conveyance distances and/or large pipe diameters are involved, depending on the properties of the bulk material concerned.

The reason for this is the near instant expansion of the compressed volume of gas between the plug just about to leave the pipe and the plug following it. This dynamic expansion process produces strong acceleration and an increase in the-velocity of the plug following, due to the absence of any counter-pressure at the front end thereof. As a result of this, transient blockages materialize at the diverting positions in the conveying line and at temporary pile-ups (strands) in horizontal pipe sections which are transmitted as jolts to the piping system, the function modules thereof as well as to the bearing and supporting structure of the system. The dynamic stress in these modules, bearings and supporting structures may lead at critical positions to joints or components of the piping system becoming loose and possible to malfunctioning due to fatigue fracture. The inner dynamic action triggered by the dynamic expansion results in turn in haphazard deposits, sporadic fluctuating conveyance and thus in the shock forces being aggravated. These acceleration and deceleration actions in the piping system produce excessive mass forces and elevated friction forces due to added compression of the bulk material in the plug and thus result in additional energy losses as compared to a smoother means of conveyance. For the above reasons higher attrition and thread percentages materialize than is the case with a smoother, shock-reduced plug or slow means of conveyance.

From DE 40 39 496 A1 a method is known of continuously conveying bulk material, in which the bulk material is charged from a catchment vessel via a rotary vane feeder and transported by means of a conveying medium into a conveying pipe, the conveying medium being introduced into the conveying pipe via a pneumatic pipe. With the aid of a regulating means the ratio of bulk throughput and conveying medium is maintained constant in the conveying pipe, the intention being to maintain conveyance constant despite the leakage air flow escaping via the rotary vane feeder. In a variant specially devised for plug conveyance the conveying medium is supplied intermittently and the conveying pipe features a syphon-type bend following the feed point, because this assists forming the plug.

Despite this "pulsing" at the start of the conveying pipe an unwanted dynamic expansion of the end of the pipe materializes with this method and the means thereof, too. This method prevents the dynamic expansion actions only at the end of a short conveying pipe length. When longer piping is involved specific dynamic relationships of plug length, plug spacing and pile-ups automatically materialize as a function of the piping diameters, the properties of the bulk material involved and the conveying distance, i.e. practically independently of the conditions existing at the start of the piping.

SUMMARY OF THE INVENTION

It is thus an object of the invention to reduce the high-energy and abrupt, dynamic expansion of the volume of the conveying medium between the plug being discharged and the one following it and to reduce the resulting aforementioned effects.

This object is achieved by the reducing the volume of cushions of conveying medium under pressure between successive plugs in a downstream area of the pipe in relation to the volume of cushions of conveying medium under pressure between successive plugs in an upstream area, to thereby decrease energy liberated during expansion of cushions of conveying medium when exiting through an outlet of the pipe.

In accordance with the present invention, a device for pneumatically conveying bulk material in form of discrete plugs, includes a pipe assembly for conveying bulk material by means of a conveying medium under pressure in form of discrete plugs of variable length which are separated from each other by cushions of conveying medium, and means interposed in the pipe assembly for reducing a volume of the cushions of conveying medium between successive plugs in a downstream area of the pipe in relation to a volume of the cushions of conveying medium between successive plugs in an upstream area of the pipe assembly.

Advantageous embodiments are evident from the subclaims.

BRIEF DESCRIPTION OF THE DRAWINGS

The invention will now be explained with reference to the accompanying drawing in which.

DESCRIPTION OF THE PREFERRED EMBODIMENTS

Figure 1:
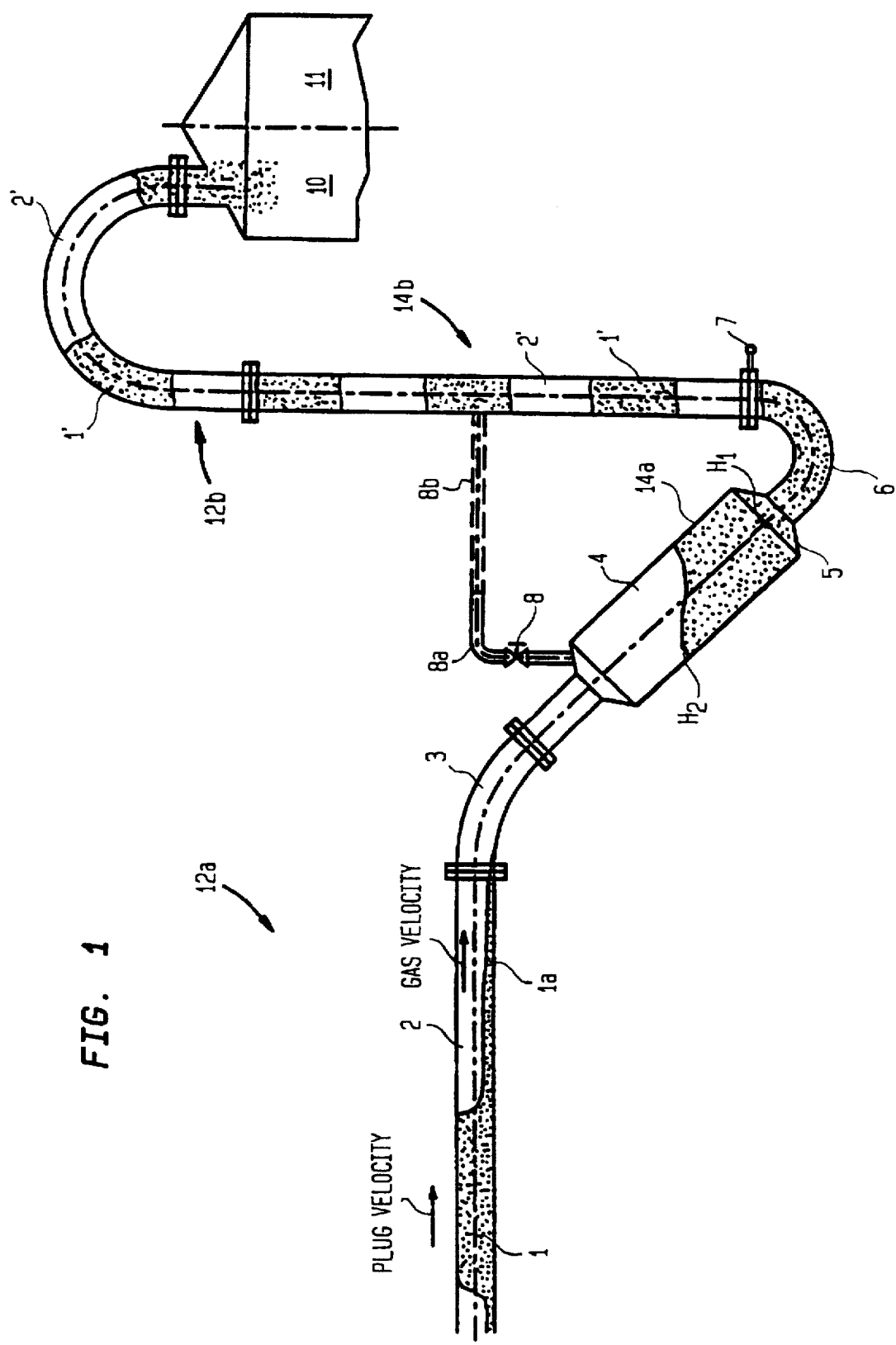
FIG. 1 is a schematic illustration of one embodiment of a device for pneumatic plug conveyance of bulk material, in accordance with the present invention.

In FIG. 1 plugs of bulk material 1 are conveyed pneumatically by means of a compressible conveying medium 2 spaced away from each other through an e.g. 200 m long conveying pipe until they attain the horizontal end portion 12a thereof. Here, the bulk plugs 1 are introduced with next to no shock via a bend 3 or a diverting flared piece into a preferably right cylindrical expansion piece of the pipe 4, because they lose their consistency due to lack of packing force in the downwards movement at the strands 1a and the lack of friction at the wall of the pipe. The bulk material collects in a junction piece 5 and/or in a diverter piece 6 which is preferably formed as a bend of small radius. By means of a correspondingly dimensioned reduction in the cross-section and/or a gate 7 and/or a degassing valve 8 or similar means a backup level pulsating between the levels H1 and H2 is achievable by setting the aforementioned control members preferably once-only. The minimum level Hi prevents shock expansion upstream through the pipe, and the maximum level H2 prevents an excessive increase in pressure and thus a blockage. Instead of a once-only setting operation may be achieved with a variable setting depending on the backup level and/or the pressure increase due to open or closed loop control of the gate 7 and/or the degassing valve 8. The diverter piece 6 is followed by a vertical pipe section 12b to cause smaller plugs 1' having a lesser spacing from each other to materialize downstream of the diverter piece 6.

Depending on the properties of the bulk material and the pipe dimensions it is possible, if required, to dispense with generating and maintaining a continuous buffer level of the bulk material within the limits Hi and H2 or with providing the gate 7 and/or the degassing valve 8, since after being diverted into the vertical, smaller plugs 1having a lesser spacing from each other materialize so that both the differences in pressure with respect to the external pressure and the volume 2' of the compressed conveying medium between plugs in sequence are reduced. Since this also results in the complete amount 2' of the compressed conveying medium between plugs in sequence as well as its absolute pressure being reduced, much less energy is liberated on expansion of this compressed conveying medium 2 at the end of the pipe 10 than when the plug 1 of bulk material were to leave the end portion 12a e.g. at the bend 3. By this arrangement the decompression of the previously compact plug is "stuttered" so that the shock forces in the vertical pipe as well as the spacing between plugs and thus also the advancing decompression volume thereof, due to the extension of the dwell time of this train of partial plugs, are all reduced. As a result of this the shocks at the inlet to the converter, which have already been damped by the pipe extension 4 in any case, as well as the shocks possible still further upstream in the straight pipe section 1a are prevented or further reduced.

The degassing valve 8 may also be used to decompress part of the volume in the intermediate space from the pipe extension 4, a reduction in the velocity of the conveying medium and thus also of the plug velocity in the pipe section following the converter then materializing, apart from the aforementioned conversion of the plug. At the same time, the reduction in the velocity of the conveying medium in this region helps in further increasing the dwell time of the partial plugs and thus in reducing the shock tendency of the decompression from the region 12b into the region 12a. Another possibility of reducing the flow velocity of the conveying medium consists of increasing the diameter of the vertical pipe section 12b. On exit of the size-reduced plug 1' of bulk material in the receiving vessel 11 an also size-reduced volume 2' of compressed conveying medium, extending from the moment of plug exit to the following plug 1', is able to expand.

Figure 2:
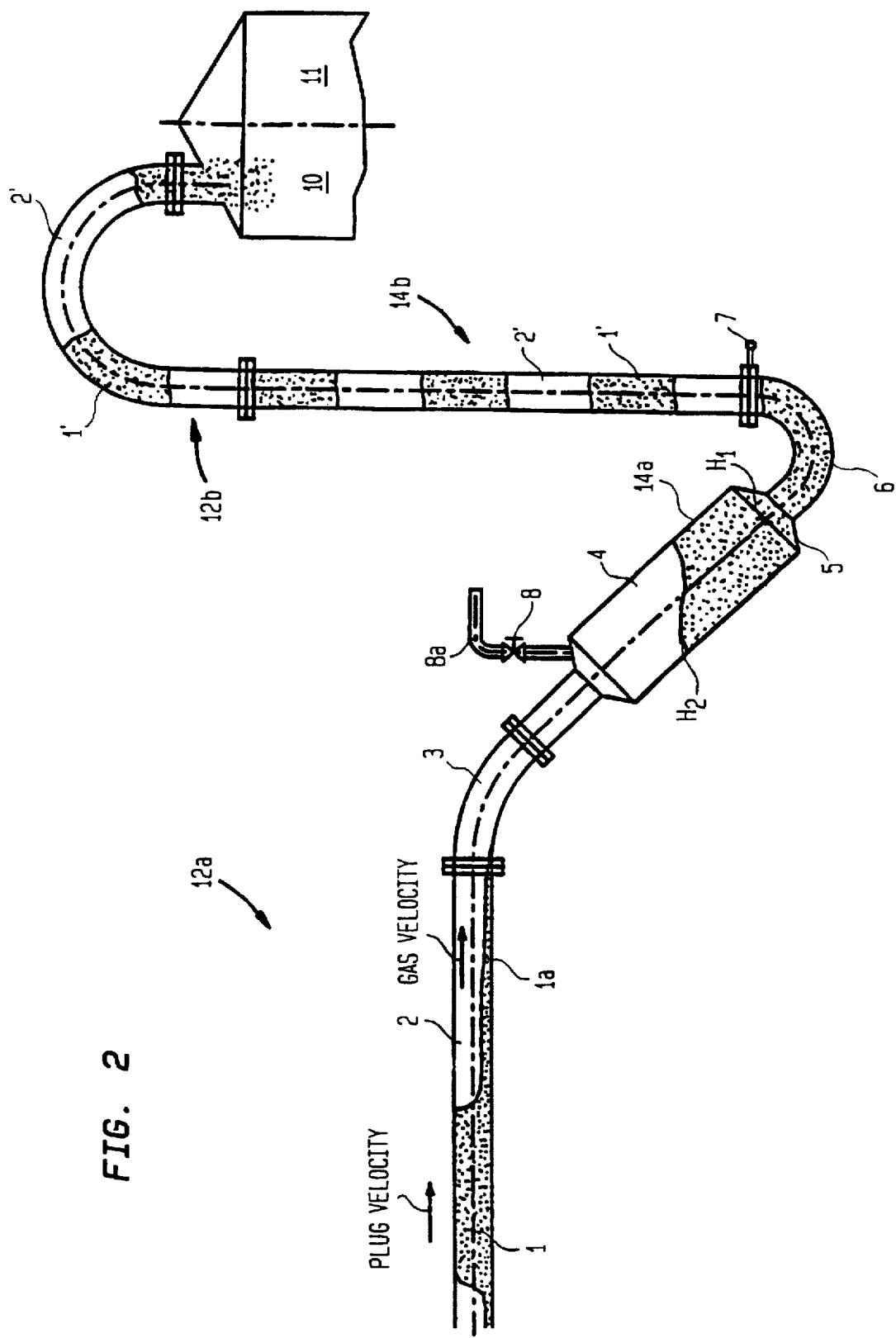
FIGS. 2 and 3 are variations of the device of FIG. 1.
Figure 3:
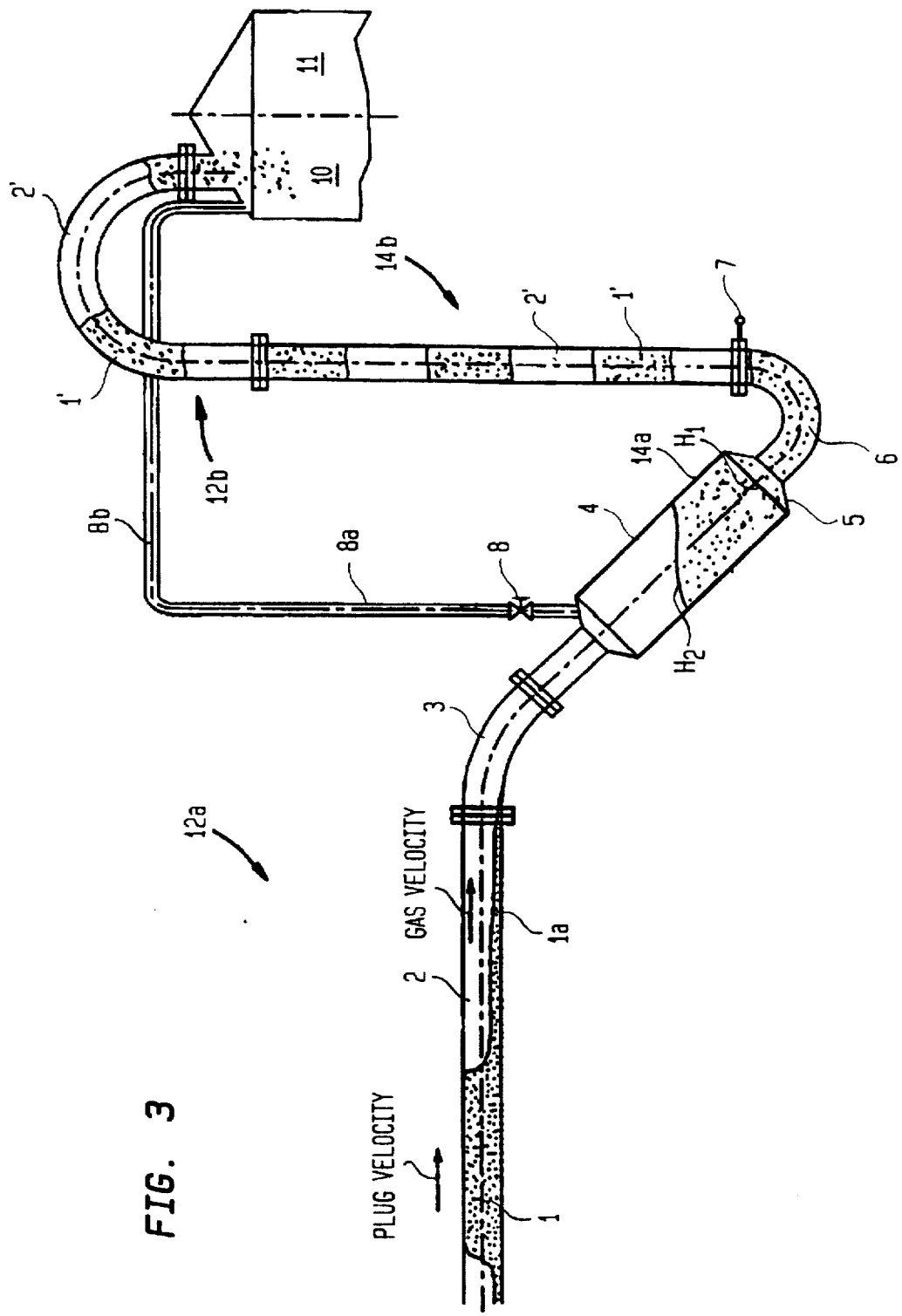

Optionally the connecting port 8a of the degassing port 8 may also be connected to the vertical pipe by a bypass pipe 8b, or may open into the atmosphere, as shown in FIG. 2, or via the bypass pipe 8b into the silo or receiving vessel 11, as shown in FIG. 3.

In the drawing the pipe flare 4 is depicted as a cylindrical pot having a center line inclined roughly 45° to the perpendicular. Instead of this a vessel may also be used having a vertical center line and a funnel-type bottom.

Figure 4:
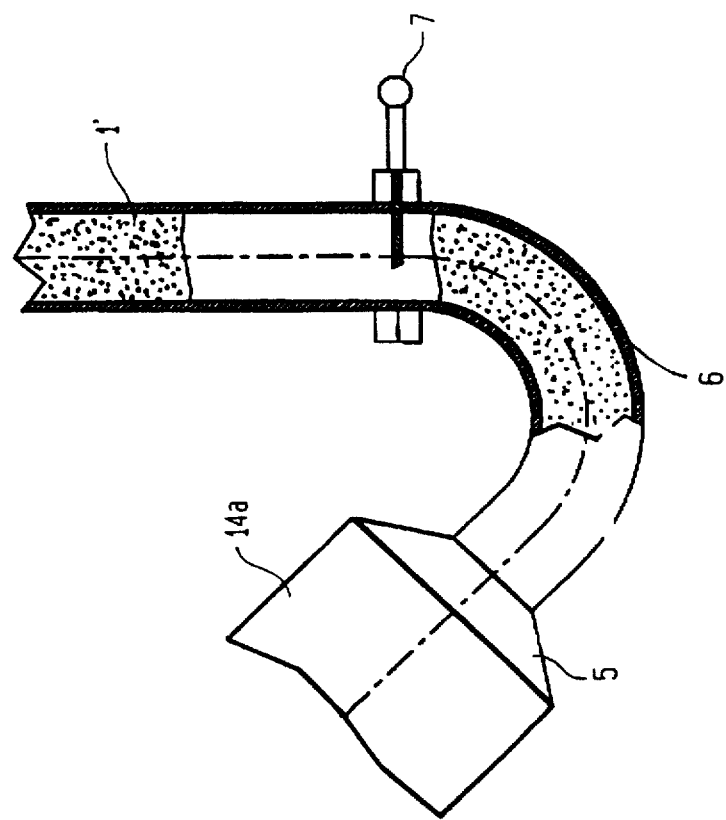
FIG. 4 is a cutaway view of an exemplified throttle, on an enlarged scale, to maintain a desired filling level.

Furthermore as shown in FIG. 4, instead of the gate 7 some other means of throttling, e.g. a butterfly valve may be employed which e.g. is arranged to immediately follow the aforementioned vessel and which changes the opening of the throttling gap by open or closed loop control so that the filling level in the vessel is maintained between a minimum and a maximum level.

What is claimed is:

1. A method of pneumatically conveying bulk material in form of discrete plugs, comprising the steps of:
    feeding bulk material together with a conveying medium under pressure through a pipe as to form discrete plugs which are separated from each other by cushions of conveying medium, and
    reducing a volume of the cushions of conveying medium between successive plugs in a downstream area of the pipe in relation to a volume of the cushions of conveying medium between successive plugs in an upstream area of the pipe to thereby decrease energy liberated during expansion of cushions of conveying medium when exiting through an outlet of the pipe.

2. The method of claim 1 wherein said reducing step includes a transformation of the plugs from the upstream area to plugs in the downstream area of reduced length and reduced mutual distance compared to a length of and mutual distance between the plugs in the upstream area.

3. The method of claim 2 wherein said transformation step includes conveying the plugs in the upstream area through a syphon-type pipe section.

4. The method of claim 3 wherein said conveying step includes directing the plugs in the upstream area through a pipe section of enlarged cross section positioned upstream of the syphon-type pipe section for allowing an interim deposit and delayed discharge of bulk material.

5. The method of claim 4 wherein bulk material is deposited in the pipe section of enlarged cross section at a level which is kept between a minimum level and a maximum level.

6. The method of claim 3 wherein the downstream area of the pipe includes a vertical pipe connected downstream of the syphon-type pipe section.

7. The method of claim 6 wherein the level of deposited bulk material in the pipe section of enlarged cross section is adjusted by an element selected from the group consisting of a degassing device arranged upstream of the pipe section of enlarged cross section, a gate, and a throttle mechanism arranged downstream of the syphon-type pipe section, with conveying medium being discharged into the atmosphere, or to the vertical pipe or to a silo.

8. The method of claim 1 wherein said reducing step includes discharge of conveying medium upstream of the outlet of the pipe.

9. The method of claim 8 wherein said discharge step includes a discharge of conveying medium only between two successive plugs of reduced length and reduced mutual distance.

10. A device for pneumatically conveying bulk material in form of discrete plugs, comprising:
    a pipe assembly for conveying bulk material by means of a conveying medium under pressure in form of discrete plugs of variable length which are separated from each other by cushions of conveying medium, and
    means interposed in said pipe assembly for reducing a volume of the cushions of conveying medium between successive plugs in a downstream area of the pipe in relation to a volume of the cushions of conveying medium between successive plugs in an upstream area of the pipe assembly.

11. The device of claim 10 wherein said reducing means includes a transformation unit for transforming plugs in the upstream area to plugs in the downstream area of reduced length and reduced mutual spacing.

12. The device of claim 11 wherein the transformation unit includes a syphon-like pipe section positioned downstream of the upstream area.

13. The device of claim 12 wherein the pipe assembly includes a pipe section of expanded cross section positioned upstream of the syphon-type pipe section for allowing a deposit and delayed discharge of bulk material.

14. The device of claim 11, and further comprising a degassing unit connected to an upstream end of the pipe section of enlarged cross section to keep deposited bulk material in the pipe section of enlarged cross section between a minimum filling level and a maximum filling level.

15. The device of claim 12 wherein the pipe assembly includes a vertical pipe connected downstream of the syphon-type pipe section.

16. A pipe assembly for conveying bulk material in form of plugs utilizing a conveying medium under pressure, comprising:

an upstream pipe section for conveying bulk material in form of plugs of relatively greater length and spaced from each other by cushions of conveying medium of relatively greater length;

a downstream pipe section in communication with the upstream pipe section and so configured as to conduct plugs of relatively smaller length and separated from each other by cushions of conveying medium of relatively smaller length; and a buffer positioned between the upstream pipe section and the downstream pipe section for allowing a deposit and delayed discharge of bulk material into the downstream pipe section.

17. The device of claim 16 wherein the downstream pipe section includes a pipe bend having one end connected to the upstream pipe section and another end, and a vertical pipe section connected to the other end of the pipe bend.

18. The device of claim 16, and further comprising a degassing unit extending between the buffer and the downstream pipe section to keep deposited bulk material in the buffer between a minimum filling level and a maximum filling level.

* * * * *